(12) United States Patent
Falco et al.

(10) Patent No.: US 9,083,614 B2
(45) Date of Patent: Jul. 14, 2015

(54) SYSTEM AND METHOD FOR SUPPORTING OUT-OF-ORDER MESSAGE PROCESSING IN A DISTRIBUTED DATA GRID

(71) Applicant: Oracle International Corporation, Redwood Shores, CA (US)

(72) Inventors: Mark Falco, Burlington, MA (US); Gene Gleyzer, Lexington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 231 days.

(21) Appl. No.: 13/671,481

(22) Filed: Nov. 7, 2012

(65) Prior Publication Data

US 2014/0108533 A1   Apr. 17, 2014

Related U.S. Application Data

(60) Provisional application No. 61/714,100, filed on Oct. 15, 2012.

(51) Int. Cl.
*H04L 29/08* (2006.01)
*H04L 12/26* (2006.01)
*G06F 17/30* (2006.01)
*G06F 11/16* (2006.01)
*H04L 12/24* (2006.01)

(52) U.S. Cl.
CPC ............ *H04L 43/0811* (2013.01); *G06F 11/16* (2013.01); *G06F 17/30067* (2013.01); *G06F 17/30371* (2013.01); *H04L 67/1095* (2013.01); *H04L 41/0668* (2013.01)

(58) Field of Classification Search
CPC ... H04L 67/10; H04L 43/0811; H04L 49/253; H04L 29/08; H04L 41/0668; G06F 9/5072; G06F 9/546; G06F 12/0253; G06F 5/065; G06F 17/30067; G06F 17/30371; G06F 11/16
USPC .................................. 709/204–207; 719/318
See application file for complete search history.

(56) References Cited

U.S. PATENT DOCUMENTS

| | | | |
|---|---|---|---|
| 5,014,265 A | 5/1991 | Hahne et al. |
| 5,301,350 A | 4/1994 | Rogan et al. |
| 5,561,785 A | 10/1996 | Blandy et al. |
| 5,784,698 A | 7/1998 | Brady et al. |
| 6,070,202 A | 5/2000 | Minkoff et al. |
| 6,338,112 B1 | 1/2002 | Wipfel et al. |
| 6,826,597 B1 | 11/2004 | Lonnroth et al. |

(Continued)

OTHER PUBLICATIONS

Tanenbaum, Andrew S., "*Modern operating systems*" Prentice-Hall, Inc., Upper Saddle River, New Jersey, 2001. 5 pages.

(Continued)

*Primary Examiner* — Jeffrey A Gaffin
*Assistant Examiner* — Dave Misir
(74) *Attorney, Agent, or Firm* — Tucker Ellis LLP

(57) ABSTRACT

A system and method can support out-of-order message processing in a distributed data grid. A cluster node in the distributed data grid can receive a plurality of messages at a cluster node in the distributed data grid. The distributed data grid allows each message in the plurality of messages to determine whether it needs to be handled in a particular order on a first thread. The cluster node can dispatch one or more of said messages that do not need to be handled in the particular order on the first thread to one or more different threads.

20 Claims, 4 Drawing Sheets

(56) References Cited

U.S. PATENT DOCUMENTS

| | | | |
|---|---|---|---|
| 7,058,055 B2 | 6/2006 | Mugica et al. | |
| 7,139,925 B2 | 11/2006 | Dinker et al. | |
| 7,707,513 B2 | 4/2010 | Broda et al. | |
| 7,861,249 B2 * | 12/2010 | Jiang et al. | 719/313 |
| 8,024,445 B2 | 9/2011 | Kamijima et al. | |
| 8,122,006 B2 | 2/2012 | de Castro Alves et al. | |
| 8,131,894 B2 | 3/2012 | Cain et al. | |
| 8,166,095 B2 | 4/2012 | Ferwerda et al. | |
| 8,249,072 B2 | 8/2012 | Sugumar et al. | |
| 8,271,980 B2 | 9/2012 | Jackson | |
| 8,290,919 B1 | 10/2012 | Kelly et al. | |
| 8,332,493 B2 | 12/2012 | Rowley et al. | |
| 8,392,368 B1 | 3/2013 | Kelly et al. | |
| 8,510,376 B2 | 8/2013 | Kaczmarski et al. | |
| 8,539,192 B2 | 9/2013 | Castillo et al. | |
| 8,612,386 B2 | 12/2013 | Tien et al. | |
| 8,621,031 B2 | 12/2013 | Desai | |
| 8,768,981 B1 | 7/2014 | Milne et al. | |
| 2004/0010674 A1 | 1/2004 | Boyd et al. | |
| 2004/0083317 A1 * | 4/2004 | Dickson et al. | 710/22 |
| 2004/0172618 A1 | 9/2004 | Marvin | |
| 2005/0249215 A1 | 11/2005 | Kelsey et al. | |
| 2006/0026169 A1 | 2/2006 | Pasqua | |
| 2006/0112174 A1 * | 5/2006 | L'Heureux et al. | 709/223 |
| 2006/0129516 A1 | 6/2006 | Bradford et al. | |
| 2006/0161893 A1 | 7/2006 | Han et al. | |
| 2006/0230128 A1 | 10/2006 | Chung et al. | |
| 2007/0168336 A1 | 7/2007 | Ransil et al. | |
| 2008/0208960 A1 | 8/2008 | Rowley et al. | |
| 2009/0077233 A1 | 3/2009 | Kurebayashi et al. | |
| 2009/0116484 A1 | 5/2009 | Buford | |
| 2009/0177914 A1 | 7/2009 | Winchell | |
| 2010/0005472 A1 * | 1/2010 | Krishnaraj et al. | 718/104 |
| 2010/0017461 A1 | 1/2010 | Kokkevis et al. | |
| 2010/0037222 A1 * | 2/2010 | Tatsubori et al. | 718/100 |
| 2010/0042755 A1 | 2/2010 | Fuente et al. | |
| 2010/0060934 A1 | 3/2010 | Bellert | |
| 2010/0125624 A1 | 5/2010 | Bachhuber-Haller et al. | |
| 2010/0265945 A1 | 10/2010 | Bejerano et al. | |
| 2010/0333099 A1 * | 12/2010 | Kupferschmidt et al. | 718/103 |
| 2011/0004701 A1 * | 1/2011 | Panda et al. | 709/242 |
| 2011/0055322 A1 | 3/2011 | Gregersen | |
| 2011/0137991 A1 | 6/2011 | Russell | |
| 2011/0225120 A1 | 9/2011 | Cooper et al. | |
| 2011/0225121 A1 | 9/2011 | Cooper et al. | |
| 2011/0225122 A1 | 9/2011 | Denuit et al. | |
| 2011/0246550 A1 | 10/2011 | Levari et al. | |
| 2012/0113896 A1 | 5/2012 | Karol | |
| 2012/0144025 A1 | 6/2012 | Melander et al. | |
| 2012/0197840 A1 | 8/2012 | Oliver et al. | |
| 2012/0197959 A1 * | 8/2012 | Oliver et al. | 709/201 |
| 2012/0198455 A1 * | 8/2012 | Lee et al. | 718/100 |
| 2012/0278398 A1 | 11/2012 | Lowekamp | |
| 2012/0331029 A1 | 12/2012 | King, III et al. | |
| 2013/0014114 A1 * | 1/2013 | Nagata | 718/102 |
| 2013/0041969 A1 | 2/2013 | Falco et al. | |
| 2013/0073809 A1 | 3/2013 | Antani et al. | |
| 2013/0074101 A1 * | 3/2013 | Oliver et al. | 719/318 |
| 2013/0103837 A1 | 4/2013 | Krueger | |
| 2013/0128726 A1 | 5/2013 | Hellhake et al. | |
| 2013/0262632 A1 | 10/2013 | Fein | |
| 2013/0325543 A1 * | 12/2013 | Magee et al. | 705/7.25 |
| 2014/0016457 A1 | 1/2014 | Enyedi et al. | |
| 2014/0219209 A1 | 8/2014 | Soneda et al. | |

OTHER PUBLICATIONS

Tanenbaum, Andrew S., Computer Networks, Fourth Edition 2003, Prentice Hall PTR, Chapter 5.2.7 Broadcast Routing, 3 pages.
Andrew S. Tanenbaum, Computer Networks: Fourth Edition, Prentice Hall PTR, Upper Saddle River, NJ (2003), 6 pages.
Martin Sustrik, [zeromq-dev] Subports, Grokbase, Jul. 2011, 6 pages <http://grokbase.com/t/zeromq/zeromq-dev/117vwvr6z9/subports>.
Class Socketchannel, Java™ 2 Platform Standard Ed. 5.0, Copyright © 2004, 2010 Oracle Int'l Corp., 12 pages. <http://docs.oracle.com/javase/1.5.0/docs/api/java/nio/channels/SocketChannel.html>.

* cited by examiner

SYSTEM AND METHOD FOR SUPPORTING OUT-OF-ORDER MESSAGE PROCESSING IN A DISTRIBUTED DATA GRID

CLAIM OF PRIORITY

This application claims priority on U.S. Provisional Patent Application No. 61/714,100, entitled "SYSTEM AND METHOD FOR SUPPORTING A DISTRIBUTED DATA GRID IN A MIDDLEWARE ENVIRONMENT," by inventors Robert H. Lee, Gene Gleyzer, Charlie Helin, Mark Falco, Ballav Bihani and Jason Howes, filed Oct. 15, 2012, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCED APPLICATIONS

The current application hereby incorporates by reference the material in the following patent applications:

U.S. patent application Ser. No. 13/671,369, entitled "SYSTEM AND METHOD FOR SUPPORTING GUARANTEED MULTI-POINT DELIVERY IN A DISTRIBUTED DATA GRID," by inventors Robert H. Lee and Gene Gleyzer, filed Nov. 7, 2012.

U.S. patent application Ser. No. 13/671,376, entitled "SYSTEM AND METHOD FOR PROVIDING PARTITION PERSISTENT STATE CONSISTENCY IN A DISTRIBUTED DATA GRID," by inventors Robert H. Lee and Gene Gleyzer, filed Nov. 7, 2012.

U.S. patent application Ser. No. 13/671,408, entitled "SYSTEM AND METHOD FOR SUPPORTING TRANSIENT PARTITION CONSISTENCY IN A DISTRIBUTED DATA GRID," by inventors Robert H. Lee and Gene Gleyzer, filed Nov. 7, 2012.

U.S. patent application Ser. No. 13/671,395, entitled "SYSTEM AND METHOD FOR SUPPORTING ASYNCHRONOUS MESSAGE PROCESSING IN A DISTRIBUTED DATA GRID," by inventor Gene Gleyzer, filed Nov. 7, 2012.

FIELD OF THE INVENTION

The present invention is generally related to computer systems, and is particularly related to a distributed data grid.

BACKGROUND

Modern computing systems, particularly those employed by larger organizations and enterprises, continue to increase in size and complexity. Particularly, in areas such as Internet applications, there is an expectation that millions of users should be able to simultaneously access that application, which effectively leads to an exponential increase in the amount of content generated and consumed by users, and transactions involving that content. Such activity also results in a corresponding increase in the number of transaction calls to databases and metadata stores, which have a limited capacity to accommodate that demand.

This is the general area that embodiments of the invention are intended to address.

SUMMARY

Described herein are systems and methods that can support out-of-order message processing in a distributed data grid. A cluster node in the distributed data grid can receive a plurality of messages at the cluster node in the distributed data grid. The distributed data grid allows each message in the plurality of messages to determine whether it needs to be handled in a particular order on a first thread. The cluster node can dispatch one or more of said messages that do not need to be handled in the particular order on the first thread to one or more different threads.

DETAILED DESCRIPTION

Figure 1:
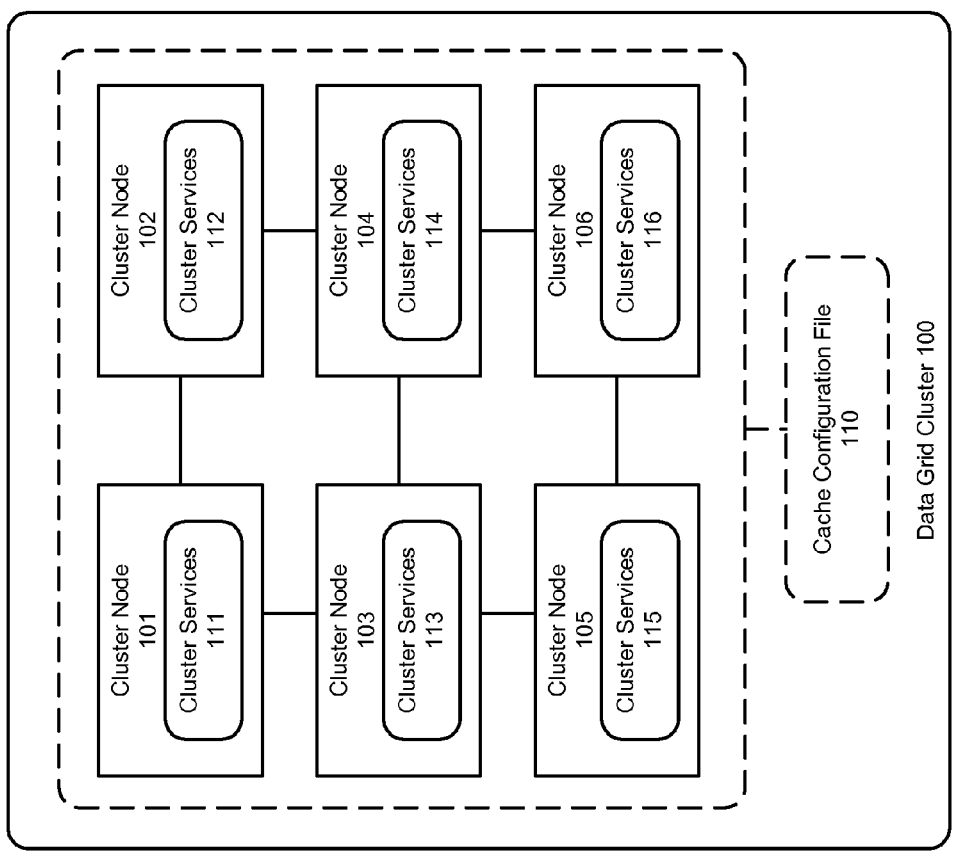
FIG. 1 is an illustration of a data grid cluster in accordance with various embodiments of the invention.

Described herein are systems and methods that can support out-of-order message processing in a distributed data grid.

In accordance with an embodiment, as referred to herein a "distributed data grid", "data grid cluster", or "data grid", is a system comprising a plurality of computer servers which work together to manage information and related operations, such as computations, within a distributed or clustered environment. The data grid cluster can be used to manage application objects and data that are shared across the servers. Preferably, a data grid cluster should have low response time, high throughput, predictable scalability, continuous availability and information reliability. As a result of these capabilities, data grid clusters are well suited for use in computational intensive, stateful middle-tier applications. Some examples of data grid clusters, e.g., the Oracle Coherence data grid cluster, can store the information in-memory to achieve higher performance, and can employ redundancy in keeping copies of that information synchronized across multiple servers, thus ensuring resiliency of the system and the availability of the data in the event of server failure. For example, the Coherence data grid provides replicated and distributed (partitioned) data management and caching services on top of a reliable, highly scalable peer-to-peer clustering protocol.

An in-memory data grid can provide the data storage and management capabilities by distributing data over a number of servers working together. The data grid can be middleware that runs in the same tier as an application server or within an application server. It can provide management and processing of data and can also push the processing to where the data is located in the grid. In addition, the in-memory data grid can eliminate single points of failure by automatically and transparently failing over and redistributing its clustered data management services when a server becomes inoperative or is disconnected from the network. When a new server is added, or when a failed server is restarted, it can automatically join the cluster and services can be failed back over to it, transparently redistributing the cluster load. The data grid can also include network-level fault tolerance features and transparent soft re-start capability.

In accordance with an embodiment, the functionality of a data grid cluster is based on using different cluster services. The cluster services can include root cluster services, partitioned cache services, and proxy services. Within the data grid cluster, each cluster node can participate in a number of cluster services, both in terms of providing and consuming the cluster services. Each cluster service has a service name that uniquely identifies the service within the data grid cluster, and a service type, which defines what the cluster service can do. Other than the root cluster service running on each cluster node in the data grid cluster, there may be multiple named instances of each service type. The services can be either configured by the user, or provided by the data grid cluster as a default set of services.

FIG. 1 is an illustration of a data grid cluster in accordance with various embodiments of the invention. As shown in FIG. 1, a data grid cluster 100, e.g. an Oracle Coherence data grid, includes a plurality of cluster nodes 101-106 having various cluster services 111-116 running thereon. Additionally, a cache configuration file 110 can be used to configure the data grid cluster 100.

Out-of-Order Message Processing

In accordance with an embodiment of the invention, out-of-order message processing can be supported in a distributed data grid.

Figure 2:
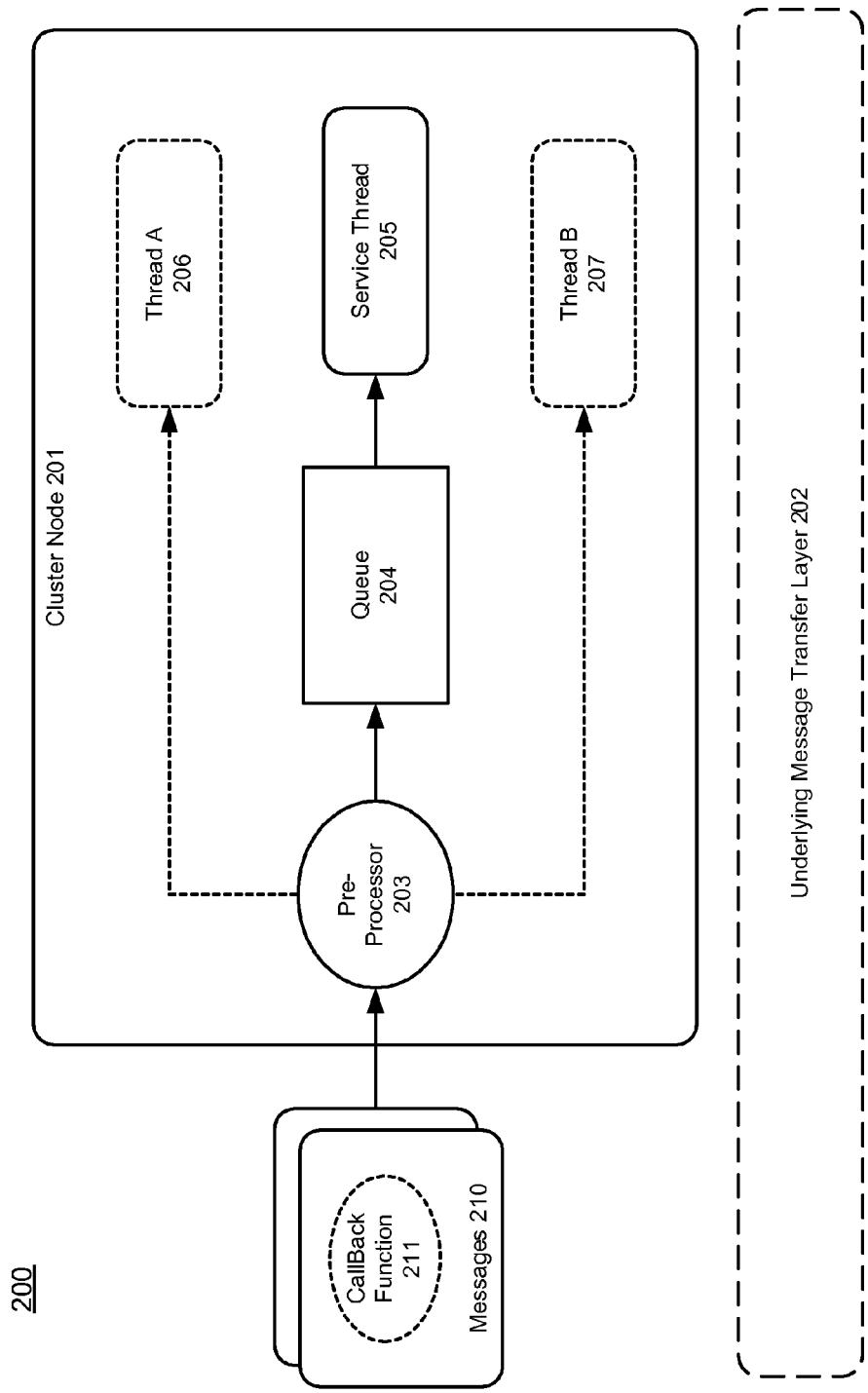
FIG. 2 shows an illustration of supporting out-of-order message processing at a cluster node in a distributed data grid, in accordance with an embodiment of the invention.

FIG. 2 shows an illustration of supporting out-of-order message processing at a cluster node in a distributed data grid, in accordance with an embodiment of the invention. As shown in FIG. 2, a cluster node 201 in a distributed data grid 200 can receive a plurality of messages 210, e.g. from either another node or a client outside the distributed data grid 200.

There can be different types of messages in the distributed data grid 200 serving various functional purposes. For example, there can be internal messages that support various system operations within the distributed data grid 200. There can also be external request messages from different outside clients. From the messaging processing perspective, not every message may need to be processed using the implicit ordering guarantee that is provided by the underlying message transfer layer 202.

In accordance with an embodiment of the invention, the distributed data grid 200 can support message processing based on an underlying message transfer layer 202. The underlying message transfer layer 202 can implicitly guarantee that the plurality of messages are received at the cluster node 201 in a stream with a particular order. For example, the underlying message transfer layer 202 can be based on either a standard network protocol such as the Transmission Control Protocol/Internet Protocol (TCP/IP) or a proprietary network protocol such as the Oracle Coherence Tangosol Cluster Management Protocol (TCMP).

The distributed data grid 200 can separate various data grid service functionalities at each cluster node 201 from the underlying message transfer layer 202. For example, various services deployed on the cluster node 201 can handle the different types of incoming messages 210 and can provide the requested functionalities, while the underlying message transfer layer 202 can provide physical means, such as the threading models, for transferring the different types of messages.

As shown in FIG. 2, the cluster node 201 can provide a message queue 204 for handling the different incoming messages 210, e.g. using a single thread model on a message processing service thread 205. Different unrelated incoming messages can be pushed into the message queue 204, and can be processed sequentially on message processing service thread 205 according to a particular order.

Thus, the single thread model can cause a bottle neck at the message processing thread 205, when there are a large amount of incoming messages. In order to alleviate the bottle neck at the message processing service thread 205, the cluster node 201 allows for pre-processing the incoming messages 210, e.g. using a pre-processor 203, before push them into the message queue 204. The pre-processor 203 can dispatch the pre-processing of the incoming messages 210 to other threads, e.g. threads A-B 206-207.

Additionally, each message 210 can specify, or be capable of determining at the runtime, whether it needs to be handled in a particular order on the message processing service thread 205 or to be pre-processed on the other threads. For example, an incoming message 210 can be pre-processed on the other threads than the message processing service thread 205, when it does not have dependencies on the processing on other messages.

Such a self-processing feature enabled in each incoming message 210 allows the processing of the incoming messages 210 to become more transparent. Also, the underlying message transfer layer 202, which can be based on a message transporting protocol, is not in the best position to determine whether each message should be handled in the message processing service thread 205 or not. Thus, the distributed data grid 200 can avoid relying on the underlying message transfer layer 202 for making such sub-optimal decisions.

In accordance with an embodiment of the invention, each message 210 can provide a callback function 211, or a software hook, in the message data structure in order to inform the underlying message transfer layer 202 whether the message 210 can be pre-processed, and/or whether it needs to be handled in the particular order on the message processing service thread 205.

Furthermore, the callback function 211 in each said message can include different application logics. Such application logics can be as simple as a hard coded flag or can be implemented in much more complex application code. The determination of whether a message is capable of being pre-processed can be performed at the runtime on a per message base.

As shown in FIG. 2, the cluster node 201 can request each incoming message 210 to pre-process itself using the callback function. If the incoming message 210 determines that it does not need to be pushed into the message queue 204 for processing on the message processing service thread 205, then, the cluster node 201 can dispatch the incoming messages 210 to other threads, e.g. thread A 206 and thread B 207, for message processing, or message pre-processing. Thus, the distributed data grid 200 can provide scalability and alleviate the bottleneck in message processing on the cluster node 201 by spreading out the computation load and potentially processing the incoming message 210 in parallel.

In accordance with an embodiment of the invention, the distributed data grid 200 can provide result messages to a client application after receiving a request from the client application and eventually processing the request. The result messages can be processed out-of-order, since the result messages are designated to the user on the client end and no particular order may be required.

Similarly, the request messages can also be processed out-of-order. A request message can be either an internal request message or an external request messages. The distributed data grid allows the processing of the incoming request messages on a message-by-message base. Additionally, when multiple concurrent request messages are received from the same client, the distributed data grid 200 may process these concurrent request messages in parallel under the assumptions that these concurrent request messages are created in parallel at the client side.

Figure 3:
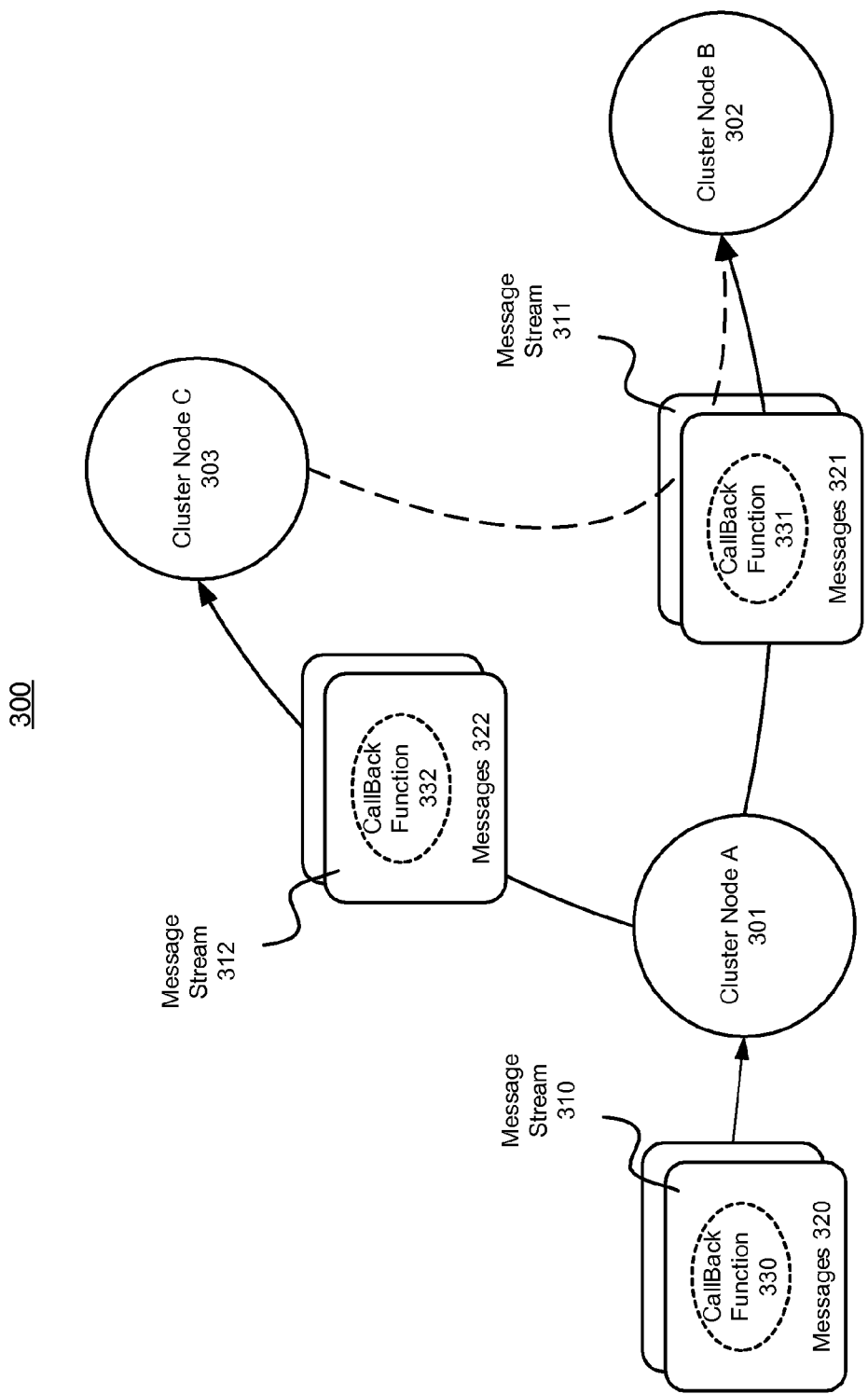
FIG. 3 shows an illustration of handling multiple message streams in a distributed data grid, in accordance with an embodiment of the invention.

FIG. 3 shows an illustration of handling multiple message streams in a distributed data grid, in accordance with an embodiment of the invention. As shown in FIG. 3, the distributed data grid 300 can include a plurality of cluster nodes, e.g. the cluster nodes A-C 301-303.

The different cluster nodes 301-303 can process the messages received. For example, the cluster node A 301 can receive a stream of messages, e.g. message stream 310, from one or more upstream nodes. Additionally, both the cluster node B 302 and the cluster node C 303 can each receive a stream of messages, e.g. message streams 311-312, from the cluster node A 301. These messages 320-322 can either being originated from the cluster node A 301 or from other upstream nodes. Furthermore, the stream of messages 311 received at the cluster node B can further include one or more messages from the cluster node C 303.

Within each message stream 310-312, the messages 320-322 can be transferred in a particular order, as it is implicitly guaranteed by the underlying transfer layer. In accordance with an embodiment of the invention, each cluster node 301-303 within the distributed data grid 300 can be configured to handle out-of-order message processing. Thus, the message pre-processing at each cluster node 301-303 can be on a message-by-message base, without a need for awareness from the underlying transfer layer.

Additionally, the same message can appear in different streams of messages 310-312, and this message can be processed differently by the different cluster nodes 301-303. For example, the cluster node B 302 and the cluster node C 303 can use different thread models to process a same result message when the cluster node B 302 has a message arrived from the cluster node C 303 before the result message.

Figure 4:
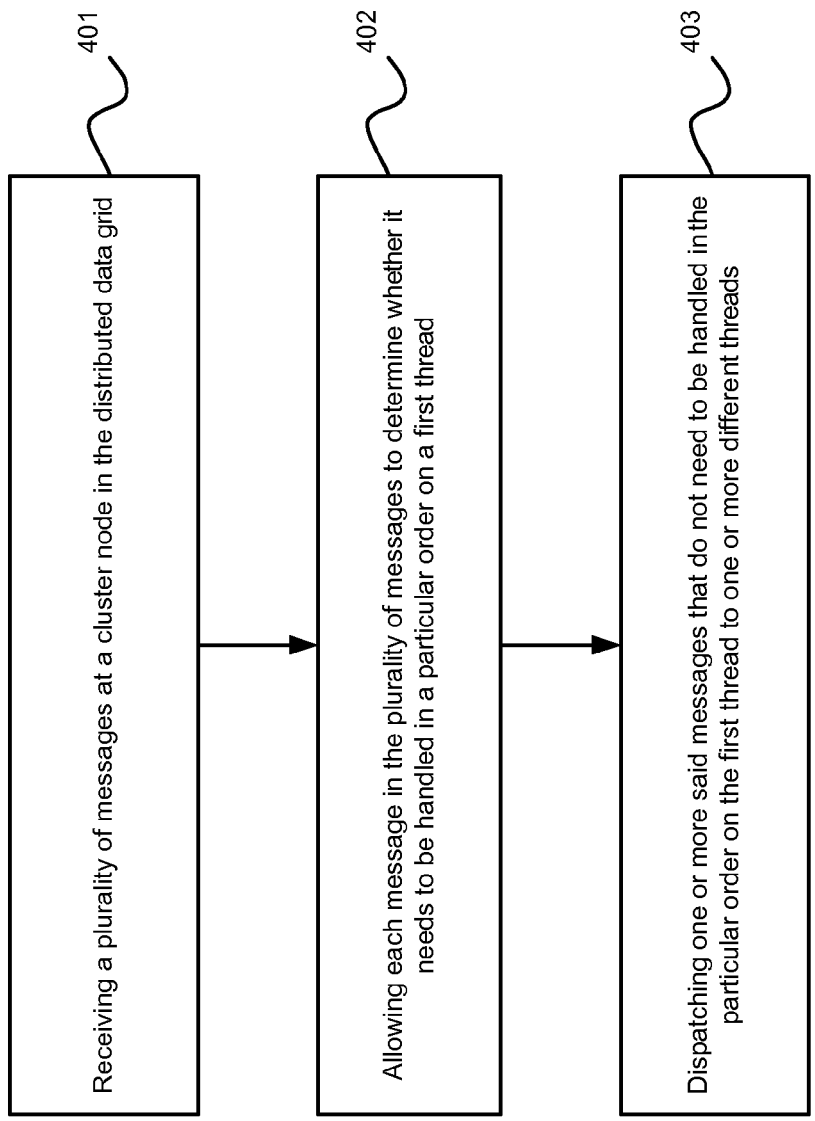
FIG. 4 illustrates an exemplary flow chart for supporting out-of-order message processing in a distributed data grid in accordance with an embodiment of the invention.

FIG. 4 illustrates an exemplary flow chart for supporting out-of-order message processing in a distributed data grid in accordance with an embodiment of the invention. As shown in FIG. 4, at step 401, a cluster node in the distributed data grid can receive a plurality of messages. Furthermore, at step 402, the cluster node allows each message in the plurality of messages to determine whether it needs to be handled in a particular order on a service thread. Then, at step 403, the cluster node can dispatch one or more said messages that do not need to be handled in the particular order on the service thread to different threads.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting out-of-order message processing in a distributed data grid comprising a plurality of cluster nodes operating on one or more microprocessors, the distributed data grid comprising a message transfer layer which guarantees in-order delivery of messages to said plurality of cluster nodes, the method comprising:
   embedding a callback function in each of a plurality of messages directed to a cluster node of said plurality of cluster nodes, wherein said callback function is configured to inform whether said message can be pre-processed and/or whether said message requires in-order processing on a message processing service queue;
   transmitting said plurality of messages to said cluster node over said message transfer layer;
   receiving said plurality of messages at said cluster node;
   preprocessing each message of said plurality of messages based on the callback function embedded in each message;
   in response to said preprocessing, pushing a first subset of said plurality of messages onto the message processing service queue for in-order processing; and
   in response to said preprocessing, dispatching a second subset of said plurality of messages to one or more different threads for out-of-order processing.

2. The method according to claim 1, wherein the message transfer layer which guarantees in-order delivery of messages to said plurality of cluster nodes utilizes the Transmission Control Protocol/Internet Protocol (TCP/IP).

3. The method according to claim 1, wherein the message transfer layer which guarantees in-order delivery of messages to said plurality of cluster nodes utilizes the Tangosol Cluster Management Protocol (TCMP).

4. The method according to claim 1, further comprising:
   said embedding step comprises embedding a callback function in the form of application code into each of said plurality of messages directed to said cluster node.

5. The method according to claim 4, further comprising:
   said embedding step comprises embedding a callback function in the form of a hard-coded flag into each of said plurality of messages directed to said cluster node.

6. The method according to claim 1, further comprising:
   processing said first subset of said plurality of messages in-order from said message processing service queue on said cluster node.

7. The method according to claim 1, further comprising:
   processing one or more of said plurality of messages on the one or more different threads in parallel.

8. A system for supporting out-of-order message processing in a distributed data grid, comprising:
   one or more microprocessors;

a plurality of cluster nodes in the distributed data grid running on the one or more microprocessors; a message transfer layer which guarantees in-order delivery of messages to said plurality of cluster nodes;

a message preprocessor in a cluster node of said plurality of cluster nodes;

a plurality of messages directed to said cluster node of said plurality of cluster nodes, wherein each of said plurality of messages includes an embedded callback function, wherein said callback function is configured to inform whether said message can be pre-processed and/or whether said message requires in-order processing on a message processing service queue;

wherein when said plurality of messages are received from said message trasfer layer at said cluster node, the message preprocessor performs steps comprising, preprocessing each message of said plurality of messages based on the callback function embedded in each message, in response to said preprocessing, pushing a first subset of said plurality of messages onto the message processing service queue for in-order processing, and in response to said preprocessing, dispatching a second subset of said plurality of messages to one or more different threads for out-of-order processing.

9. The system according to claim 8, wherein the message transfer layer which guarantees in-order delivery of messages to said plurality of cluster nodes utilizes the Transmission Control Protocol/Internet Protocol (TCP/IP).

10. The system according to claim 9, wherein the message transfer layer which guarantees in-order delivery of messages to said plurality of cluster nodes utilizes the Tangosol Cluster Management Protocol (TCMP).

11. The system according to claim 8, wherein:
the embedded callback function in each of said plurality of messages comprises application code.

12. The system according to claim 11, wherein:
the embedded callback function in each of said plurality of messages comprises a hard-coded flag.

13. The system according to claim 8, wherein:
the cluster node operates to process said first subset of said plurality of messages in-order from the message processing service queue.

14. The system according to claim 8, wherein:
the cluster node operates to process said second subset of said plurality of messages on the one or more different threads in parallel.

15. A non-transitory machine readable storage medium having instructions stored thereon for supporting out-of-order message processing in a distributed data grid comprising a plurality of cluster nodes and a message transfer layer which guarantees in-order delivery of messages to said plurality of cluster nodes, which instructions, when executed, cause said distributed data grid to perform steps comprising:

embedding a callback function in each of a plurality of messages directed to a cluster node of said plurality of cluster nodes, wherein said callback function is configured to inform whether said message can be pre-processed and/or whether said message requires in-order processing on a message processing service queue;

transmitting said plurality of messages to said cluster node over said message transfer layer;

receiving said plurality of messages at said cluster node;

preprocessing each message of said plurality of messages based on the callback function embedded in each message;

in response to said preprocessing, pushing a first subset of said plurality of messages onto the message processing service queue for in-order processing; and in response to said preprocessing, dispatching a second subset of said plurality of messages to one or more different threads for out-of-order processing.

16. The non-transitory machine readable storage medium according to claim 15, wherein the message transfer layer which guarantees in-order delivery of messages to said plurality of cluster nodes utilizes the Transmission Control Protocol/Internet Protocol (TCP/IP).

17. The non-transitory machine readable storage medium according to claim 15, wherein the message transfer layer which guarantees in-order delivery of messages to said plurality of cluster nodes utilizes the Tangosol Cluster Management Protocol (TCMP).

18. The non-transitory machine readable storage medium according to claim 15, wherein said embedding step comprises embedding a callback function in the form of application code into each of said plurality of messages directed to said cluster node.

19. The non-transitory machine readable storage medium according to claim 15, wherein said embedding step comprises embedding a callback function in the form of a hard-coded flag into each of said plurality of messages directed to said cluster node.

20. The non-transitory machine readable storage medium according to claim 15, wherein, said instructions further comprise:

processing said first subset of said plurality of messages in-order from said message processing service queue on said cluster node.

\* \* \* \* \*